United States Patent
Goldman et al.

(10) Patent No.: US 8,464,249 B1
(45) Date of Patent: Jun. 11, 2013

(54) SOFTWARE INSTALLATION PACKAGE WITH DIGITAL SIGNATURES

(75) Inventors: Oliver Goldman, Redwood City, CA (US); Michael Chou, Los Altos, CA (US); Aditya Bansod, San Franicsco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 794 days.

(21) Appl. No.: 12/562,021

(22) Filed: Sep. 17, 2009

(51) Int. Cl.
*G06F 9/445* (2006.01)
*G06F 21/00* (2006.01)
*H04L 9/32* (2006.01)

(52) U.S. Cl.
USPC ............. 717/176; 717/174; 705/51; 713/176

(58) Field of Classification Search
USPC ............. 717/168–178; 705/51; 713/176–180
See application file for complete search history.

(56) References Cited

U.S. PATENT DOCUMENTS

| | | | |
|---|---|---|---|
| 5,465,299 A | 11/1995 | Matsumoto et al. | |
| 5,606,609 A | 2/1997 | Houser et al. | |
| 5,787,175 A | 7/1998 | Carter | |
| 5,844,986 A | 12/1998 | Davis | |
| 5,861,619 A | 1/1999 | Horino et al. | |
| 5,892,904 A | 4/1999 | Atkinson et al. | |
| 6,039,248 A | 3/2000 | Park et al. | |
| 6,047,374 A | 4/2000 | Barton | |
| 6,079,018 A | 6/2000 | Hardy et al. | |
| 6,088,454 A | 7/2000 | Nagashima et al. | |
| 6,108,425 A | 8/2000 | Smith et al. | |
| 6,125,388 A | 9/2000 | Reisman | |
| 6,170,744 B1 | 1/2001 | Lee et al. | |
| 6,182,285 B1 | 1/2001 | Bleizeffer et al. | |
| 6,253,322 B1 | 6/2001 | Susaki et al. | |
| 6,253,323 B1 | 6/2001 | Cox et al. | |
| 6,353,887 B1 * | 3/2002 | Cotugno et al. | 713/165 |
| 6,367,013 B1 | 4/2002 | Bisbee et al. | |
| 6,374,401 B1 * | 4/2002 | Curtis | 717/175 |
| 6,381,742 B2 * | 4/2002 | Forbes et al. | 717/176 |
| 6,557,054 B2 * | 4/2003 | Reisman | 710/33 |
| 6,618,855 B1 | 9/2003 | Lindholm et al. | |
| 6,687,745 B1 | 2/2004 | Franco et al. | |
| 6,687,902 B1 | 2/2004 | Curtis et al. | |
| 6,725,453 B1 * | 4/2004 | Lucas et al. | 717/178 |

(Continued)

OTHER PUBLICATIONS

Ketfi et al., "Model-Driven Framework for Dynamic Deployment and Reconfiguration of Component-Based Software Systems," 2005, ACM.*

(Continued)

*Primary Examiner* — Qing Chen
(74) *Attorney, Agent, or Firm* — Wolfe-SBMC

(57) ABSTRACT

Methods, systems, and apparatus, including computer programs encoded on a computer storage medium, create and use software installation packages including digital signatures. In one aspect, a method includes obtaining a first installation package including program content and package information, which includes information stored in a platform independent format and useable in an installation sequence; converting the first installation package into a second installation package stored in a format native to a target platform, the second installation package including at least a portion of the program content and the information useable in the installation sequence, and the converting includes identifying a digital signature native to the target platform and combining the digital signature native to the target platform with a document native to the target platform, the document including at least a portion of the program content; and initiating installation on the target platform with the second, native installation package.

17 Claims, 5 Drawing Sheets

U.S. PATENT DOCUMENTS

| | | | |
|---|---|---|---|
| 6,785,815 B1 | 8/2004 | Serret-Avila et al. | |
| 6,796,489 B2 | 9/2004 | Slater et al. | |
| 6,807,633 B1 | 10/2004 | Pavlik | |
| 6,865,737 B1* | 3/2005 | Lucas et al. | 717/178 |
| 6,898,707 B1 | 5/2005 | Sit et al. | |
| 6,918,036 B1* | 7/2005 | Drews | 713/176 |
| 6,928,548 B1 | 8/2005 | Hale et al. | |
| 6,959,382 B1 | 10/2005 | Kinnis et al. | |
| 7,051,206 B1 | 5/2006 | Giest et al. | |
| 7,069,452 B1 | 6/2006 | Hind et al. | |
| 7,117,367 B2 | 10/2006 | Carro | |
| 7,130,445 B2 | 10/2006 | Ruhl et al. | |
| 7,152,158 B2 | 12/2006 | Watanabe et al. | |
| 7,222,341 B2* | 5/2007 | Forbes et al. | 717/170 |
| 7,249,258 B2 | 7/2007 | Honda et al. | |
| 7,331,063 B2 | 2/2008 | Gunyakti et al. | |
| 7,370,206 B1 | 5/2008 | Goldman | |
| 7,398,524 B2* | 7/2008 | Shapiro | 717/175 |
| 7,458,062 B2 | 11/2008 | Coulthard et al. | |
| 7,519,976 B2 | 4/2009 | Blevins | |
| 7,552,431 B2* | 6/2009 | Napier et al. | 717/169 |
| 7,555,657 B2 | 6/2009 | Nasu | |
| 7,624,272 B2* | 11/2009 | Wiseman et al. | 713/176 |
| 7,681,138 B2 | 3/2010 | Grasser et al. | |
| 7,703,073 B2 | 4/2010 | Illowsky et al. | |
| 7,735,057 B2 | 6/2010 | Rachman et al. | |
| 7,739,681 B2 | 6/2010 | Sinha et al. | |
| 7,769,991 B2 | 8/2010 | Niemela | |
| 7,797,678 B2* | 9/2010 | Moulckers et al. | 717/121 |
| 7,827,549 B2* | 11/2010 | Tarassov | 717/174 |
| 7,840,961 B1* | 11/2010 | Weathersby | 717/177 |
| 7,895,245 B2* | 2/2011 | Li et al. | 707/810 |
| 7,900,202 B2* | 3/2011 | Block et al. | 717/175 |
| 7,953,225 B2* | 5/2011 | Palum et al. | 380/269 |
| 8,006,095 B2 | 8/2011 | Berenbaum et al. | |
| 8,136,100 B1* | 3/2012 | Goldman | 717/136 |
| 8,171,469 B2* | 5/2012 | Elliott | 717/174 |
| 8,171,470 B2* | 5/2012 | Goldman et al. | 717/174 |
| 8,191,060 B2* | 5/2012 | Malasky et al. | 717/175 |
| 8,219,805 B1 | 7/2012 | Ie et al. | |
| 8,261,082 B1 | 9/2012 | Goldman | |
| 2001/0002485 A1 | 5/2001 | Bisbee et al. | |
| 2001/0029605 A1* | 10/2001 | Forbes et al. | 717/11 |
| 2001/0052121 A1* | 12/2001 | Masuda et al. | 717/11 |
| 2002/0010808 A1* | 1/2002 | Wiggins et al. | 709/328 |
| 2002/0019937 A1 | 2/2002 | Edstrom et al. | |
| 2002/0029337 A1 | 3/2002 | Sudia et al. | |
| 2002/0069282 A1* | 6/2002 | Reisman | 709/227 |
| 2002/0112162 A1 | 8/2002 | Cocotis et al. | |
| 2002/0129256 A1 | 9/2002 | Parmelee et al. | |
| 2002/0144248 A1* | 10/2002 | Forbes et al. | 717/167 |
| 2002/0157006 A1 | 10/2002 | Narishima et al. | |
| 2002/0184485 A1 | 12/2002 | Dray et al. | |
| 2002/0184504 A1 | 12/2002 | Hughes | |
| 2003/0018964 A1* | 1/2003 | Fox et al. | 717/177 |
| 2003/0023564 A1 | 1/2003 | Padhye et al. | |
| 2003/0037328 A1* | 2/2003 | Cicciarelli et al. | 717/178 |
| 2003/0105950 A1 | 6/2003 | Hirano et al. | |
| 2003/0145008 A1* | 7/2003 | Burrell | 707/100 |
| 2003/0145317 A1* | 7/2003 | Chamberlain | 717/177 |
| 2003/0159035 A1 | 8/2003 | Orthlieb et al. | |
| 2003/0188160 A1 | 10/2003 | Sunder et al. | |
| 2003/0208685 A1* | 11/2003 | Abdel-Rahman | 713/191 |
| 2004/0088377 A1 | 5/2004 | Henriquez | |
| 2004/0128503 A1 | 7/2004 | Watanabe et al. | |
| 2004/0139023 A1 | 7/2004 | Huang et al. | |
| 2004/0139430 A1* | 7/2004 | Eatough et al. | 717/174 |
| 2004/0181756 A1 | 9/2004 | Berringer et al. | |
| 2004/0193888 A1* | 9/2004 | Wiseman et al. | 713/176 |
| 2004/0194082 A1* | 9/2004 | Purkeypile et al. | 717/174 |
| 2004/0199876 A1 | 10/2004 | Ethier et al. | |
| 2005/0010752 A1 | 1/2005 | Solsona et al. | |
| 2005/0021474 A1 | 1/2005 | Geist et al. | |
| 2005/0055688 A1* | 3/2005 | Barajas et al. | 717/174 |
| 2005/0120094 A1 | 6/2005 | Tuli | |
| 2005/0155027 A1* | 7/2005 | Wei | 717/162 |
| 2005/0188357 A1 | 8/2005 | Derks et al. | |
| 2006/0005207 A1 | 1/2006 | Louch et al. | |
| 2006/0026587 A1 | 2/2006 | Lemarroy et al. | |
| 2006/0026592 A1 | 2/2006 | Simonen et al. | |
| 2006/0048134 A1* | 3/2006 | Napier et al. | 717/169 |
| 2006/0101454 A1 | 5/2006 | Whitehead | |
| 2006/0112165 A9 | 5/2006 | Tomkow et al. | |
| 2006/0225072 A1 | 10/2006 | Lari et al. | |
| 2006/0229994 A1* | 10/2006 | Moulckers et al. | 705/59 |
| 2006/0294515 A1 | 12/2006 | Gimpl et al. | |
| 2007/0006219 A1 | 1/2007 | Sinha et al. | |
| 2007/0038946 A1 | 2/2007 | Grieshaber et al. | |
| 2007/0067179 A1 | 3/2007 | Kerr et al. | |
| 2007/0094508 A1* | 4/2007 | Palum et al. | 713/176 |
| 2007/0150886 A1* | 6/2007 | Shapiro | 717/174 |
| 2007/0169111 A1* | 7/2007 | Block et al. | 717/174 |
| 2007/0208931 A1 | 9/2007 | Koue et al. | |
| 2007/0214453 A1* | 9/2007 | Dive-Reclus | 717/175 |
| 2008/0028390 A1* | 1/2008 | Fors et al. | 717/174 |
| 2008/0104098 A1* | 5/2008 | Li et al. | 707/102 |
| 2008/0109803 A1 | 5/2008 | Fisher et al. | |
| 2008/0127167 A1* | 5/2008 | Elliott | 717/174 |
| 2008/0127169 A1* | 5/2008 | Malasky et al. | 717/174 |
| 2008/0127170 A1* | 5/2008 | Goldman et al. | 717/174 |
| 2008/0127171 A1* | 5/2008 | Tarassov | 717/174 |
| 2008/0134169 A1 | 6/2008 | Williams et al. | |
| 2008/0235043 A1 | 9/2008 | Goulandris et al. | |
| 2009/0037835 A1* | 2/2009 | Goldman | 715/771 |
| 2009/0158270 A1* | 6/2009 | Funk et al. | 717/174 |
| 2011/0225575 A1 | 9/2011 | Ningombam et al. | |
| 2013/0047150 A1* | 2/2013 | Malasky et al. | 717/176 |

OTHER PUBLICATIONS

Shen et al., "Delivering Mobile Enterprise Applications on iMMS Framework," 2005, ACM, p. 289-293.*

"Adobe® Creative Suite® 4 Enterprise Manual Deployment Guide," 2008, Adobe Systems Inc., p. 1-15.*

Adelsbach et al., "Secure Software Delivery and Installation in Embedded Systems," 2005, Springer-Verlag, p. 255-267.*

Adobe Systems Incorporated, "*SWF File Format Specification Version 10*," Copyright 2006-2008 Adobe Systems Incorporated, published Nov. 2008, pp. 1-278.

Apple Computer, Inc. "Universal Binary Programming Guidelines, Second Edition", Jul. 24, 2006, retrieved from the internet at http://developer.apple.com/documentation/MacOSX/Conceptual/universal_binary/universal_binary.pdf, on Aug. 28, 2006, 96 pages.

Goldman, et al., "Intermediate Application Installation File," U.S. Appl. No. 12/029,378, filed Feb. 11, 2008, 25 pages.

Goldman, "Updating Applications Using Migration Signatures", U.S. Appl. No. 12/190,460, filed Aug. 12, 2008, 59 pages.

Grimes, "Authenticode", retrieved from the internet at http://www.microsoft.com/technet/archive/security/topics/secaps/authcode.mspx on Jan. 10, 2008, 16 pages.

LaMonica, "Flash to Jump Beyond the Browser", May 11, 2006, retrieved from the internet at http://news.com.com/Flash+to+jump+beyond+the+browser/2100-1007_3-6071005.html, on Jul. 12, 2006, 6 pages.

Macromedia, Inc. "Publishing Flash Documents—Version 8", retrieved from the internet at http://livedocs.macromedia.com/flash/8/main/00000805.html, on Aug. 16, 2006, 2 pages.

Macrovision "InstallAnywhere 7.1 Users Guide", 2006, retrieved from the internet at http://www.macrovision.com/downloads/products/flexnet_installshield/installanywhere/documentatiom/ia71_user_guide.pdf, on Jul. 11, 2006, 121 pages.

Macrovision "InstallShield MultiPlatform 5 (incl. SP3)", Oct. 27, 2003, retrieved from the internet at http://www.installshield.com/downloads/imp_imp_readme53.asp, on Aug. 28, 2006, 10 pages.

Microsoft Corporation "Windows Installer XML (WiX) Toolset", 2005 retrieved from the internet at http://wix.sourceforge.net/manual-wix2/wix_index.htm, on Jul. 11, 2006, 392 pages.

Sun Microsystems, Inc. "JAR File Specification", retrieved from the internet at http://java.sun.com/j2se/1.4.2/docs/guide/jar/jar.html, on Jan. 10, 2008, 14 pages.

Sun Microsystems, Inc. "Packaging Programs in JAR Files", retrieved from the internet at http://java.sun.com/docs/books/tutorial/deployment/jar/, on Jul. 20, 2006, 2 pages.

Swftools, "Flash Projector/Swftools.com", retrieved from the internet at http://www.swftools.com/tools-category.php?cat=290, on Aug. 16, 2006, 3 pages.

W3C "XML-Signature Syntax and Processing", retrieved from the internet at http://www.w3.org/TR/xmldsig-core/ on Feb. 10, 2008, 71 pages.

Ng, T.H. et al., Toward effective deployment of design patterns for software extension: a case study, May 2006, pp. 51-56, http://delivery.acm.org/1_0.1145/114000/1137713/p51-ng.pdf, 6 pages.

Paterson, N. MULTI: multiple user interactive template installation, Jun. 2007, p. 294, http://delivery.acm.org/1_0.1145/1260000/1255030/p294-paterson.pdf.

* cited by examiner

SOFTWARE INSTALLATION PACKAGE WITH DIGITAL SIGNATURES

BACKGROUND

The present disclosure relates to installing software on a computer platform. A computer platform is a computer including a particular operating system (OS) for that computer (e.g., WINDOWS® OS, MAC® OS, SYMBIAN OS®, or LINUX® OS). Software developers often create source code that can be appropriately compiled for respective computer platforms, and then independently generate native installation packages for each target platform. Each native installation package is associated with a specific computer platform, and these native installation packages can then be distributed for installation on appropriate machines. For a particular target platform, the appropriate native installation package is obtained from the software developer, and an OS installer can be used to process the native installation package in order to install the application. For example, INSTALLSHIELD® software can be used to produce an .msi file for installation on WINDOWS® machines, and a different software tool can be used to produce .pkg files for installation on MAC® machines.

In order to facilitate this process of generating native installation packages for distribution, some software developers have used a common specification of the installer package for different platforms. This common specification can then be used to create each respective platform-specific installation package, where the common specification indicates information such as which source files and which compiler to use for different target platforms. In any event, the distributor of the desktop application distributes different installation packages for different target platforms, and the customer generally must ensure, when acquiring a software application, that they are purchasing the correct installation package for their system.

Other software developers have created cross-platform installation packages, such as the JAVA® Archive (JAR) file format, that get deployed to the end-user system. The cross-platform package can then be expanded (e.g., decrypted and uncompressed) and written directly to disk using code provided by the software developer and/or the developer of the cross-platform package format. Typically, such cross-platform software relies on a virtual machine, such as the JAVA® Virtual Machine (JVM) (available from Sun Microsystems, Inc.), to run on the target platform.

The JVM provides a runtime environment and Java interpreter for most operating systems, including WINDOWS® OS, MAC® OS, AND LINUX® OS. Java source code files (files with a .java extension) are compiled into a format called bytecode (files with a .class extension), which can then be executed by a Java interpreter. Bytecode can be converted directly into machine language instructions by a just-in-time compiler (JIT).

Flash® Player (available from Adobe Systems Incorporated) is another virtual machine, which is used to run, or parse, Flash® files including ActionScript or SWF (SWF is a file format, such as the SWF File Format Specification (Version 10) as published, at http://www.adobe.com/devnet/swf/pdf/swf_file_format_spec_v10.pdf, by Adobe Systems Incorporated of San Jose, Calif.; the SWF file format delivers vector graphics, text, video, and sound over the Internet and is supported by Adobe® Flash® Player and Adobe AIR™ software.) The Flash® Player and Flash® Authoring software allow development of projectors (self-running SWF movies) that run on a specific target platform, by embedding the SWF data in the Flash® Player executable to create a new .exe file, and manipulating a byte pattern in the .exe file to indicate the presence of the SWF data. Such projectors can then be distributed for use on the target platform. Another runtime environment includes the ADOBE® AIR™ software, available from Adobe Systems Incorporated of San Jose, Calif., which provides cross-platform installation packages (.air files) that can be converted into native installation packages for a particular platform as needed.

In addition, some install file formats support digital signatures. Typical file formats for distribution of signed code include WINDOWS® executables employing AUTHENTICODE® software, WINDOWS® installer files (MSI), .air files, and JAR files. In each of these formats, a valid installation file may be either signed or unsigned. Thus, a software developer can create the file and then hand it off to the signer for a separate digital signing step, but both the unsigned version and the signed version of the file can be used in the installation process. Moreover, many platforms support (e.g., WINDOWS® OS, MAC® OS) and some platforms require (e.g., SYMBIAN OS®) that installed software be digitally signed using a platform-specific signing mechanism.

SUMMARY

This specification describes technologies relating to software installation packages including digital signatures. In general, one innovative aspect of the subject matter described in this specification can be embodied in methods that include the actions of obtaining a first installation package including program content and package information, the package information including information stored in a platform independent format and useable in an installation sequence; converting the first installation package into a second installation package stored in a format native to a target platform, where the second, native installation package includes at least a portion of the program content and the information useable in the installation sequence, and the converting includes identifying, in the first installation package, a digital signature native to the target platform and combining the digital signature native to the target platform with a document native to the target platform, the document including at least a portion of the program content; and initiating installation on the target platform with the second, native installation package. Other embodiments of this aspect include corresponding systems, apparatus, and computer programs, configured to perform the actions of the methods, encoded on computer storage devices.

These and other embodiments can each optionally include one or more of the following features. The converting can include excluding one or more additional digital signatures that are not native to the target platform from inclusion in the second installation package. The converting can include employing disparate conversion processes based on version information for the first installation package. For example, employing the disparate conversion processes can include selecting a template document from multiple different versions based on the version information for the first installation package, and adding information to a copy of the selected template document for the target platform.

The obtaining can include receiving first installation package from another source or location. Alternatively, the obtaining can include creating the first installation package. Creation of the first installation package can include, for each of multiple given platforms: creating an installation package stored in a format native to the given platform; generating a digital signature using the installation package stored in the format native to the given platform; and adding the digital signature to information of a cross-platform installation package to form the first installation package. In addition, the creating can include converting, at a first computer controlled by a first party, the cross-platform installation package into the installation package stored in the format native to the given platform, and the generating can include generating, at a second, different computer, controlled by a second, different party, the digital signature using the installation package stored in the format native to the given platform.

Other variations are also possible. For example, one innovative aspect of the subject matter described in this specification can be embodied in methods that include the actions of receiving a first install package including an application and multiple digital signatures for the application on different platforms, determining an intended install platform, separating a digital signature from the first install package based on the intended install platform, combining the separated digital signature with the application to form a second install package, and installing the application using second install package.

Particular embodiments of the subject matter described in this specification can be implemented so as to realize one or more of the following advantages. Platform-specific signature mechanisms can be supported for multiple target platforms by a cross-platform installation package without an excessive increase in the size of the cross-platform installation package. The size reduction can be large enough to enable creation and use of a cross-platform installation package that targets platforms for which a cross-platform installation might not otherwise be possible. Multiple different platforms can be targeted by cross-platform installation package, including platforms that require native digital signatures, while also providing the advantages of having a single installation package, including simpler distribution and installation processes and workflows.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
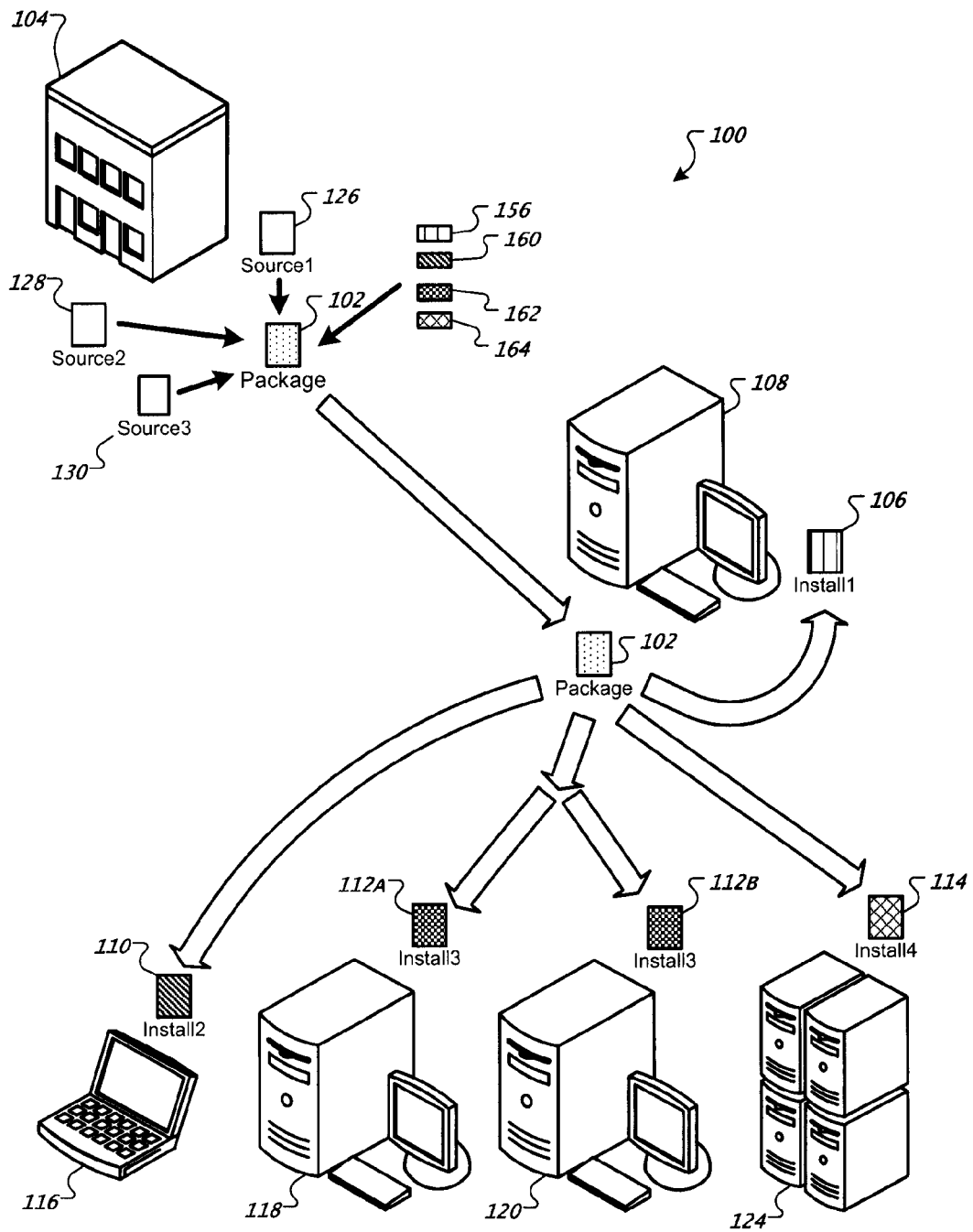
FIG. 1 is a block diagram showing an example of a system for software distribution and installation.

FIG. 1 is a block diagram showing an example of a system 100 for software distribution and installation. The system 100 can be used to install applications on various different platforms from a single source package. Such a system can simplify distribution by reducing the number of installation packages that need to be available for installing on various different computer platforms. Creation of application archives can also be made simpler by reducing the total amount of space and number of packages that need to be tracked and put into storage. Use of a cross-platform installation package can help mitigate the amount of work required to install an application to a new computer platform by reducing the portion of code that needs to be ported. As used herein, an "application" refers to a computer program that the user perceives as a distinct computer tool used for a defined purpose. An application may rely on a runtime library to operate; for example, an application can be a Flash® application that uses SWF and runs on a computer using a client-based runtime library that runs Flash® applications separately from a web browser, whether online or offline.

In the example system 100, a single cross-platform installation package 102 can be used to install an application on multiple, different platforms, even when the different target platforms require use of different digital signature schemes native to respective platforms. A user, such as an end user or administrator, can obtain the cross-platform installation package 102 from a distributor 104, where the cross-platform installation package 102 includes native digital signatures 156, 160, 162, 164 for each of multiple, different types of target platform (e.g., WINDOWS® OS, MAC® OS, and SYMBIAN OS® based computers). Native installation packages 106, 110, 112, 114 can be generated using the cross-platform installation package 102 for a target computers 108, 116, 118, 120, 124. Some of the computers 116, 118, 120, 124 can have the same or a different platform as that of the generating computer 108, or others of the computers 116, 118, 120, 124. As shown in the figure, target computers 108, 116, 118, 124 are different platforms, whereas target computers 118 and 120 are the same platform (thus, they receive copies 112A, 112B of the same native installation package 112).

The distributor 104 makes a cross-platform installation package 102 available. The distributor 104 can be a software developer, publisher, reseller, or other entity which distributes software. The distributor makes available a cross-platform installation package which includes source materials 126, 128, 130 that are used for installing the application, and also native digital signatures 156, 160, 162, 164 for each of multiple, different types of target platform. The source materials can be source code, machine code, libraries, data, documentation, configuration information, icons, or any other resource that can be used by an application or installation procedure. Portions of the source materials can be platform dependent or independent; for example, in a web browsing application, code for handling bookmarks may be the same across all computer platforms while code for handling copying and pasting may be platform-dependent. In another example, configuration files for different platforms can be included. Although the source materials can be targeted to multiple platforms, a single cross-platform package can be created which can be used to install the application on any of the supported platforms.

The user can obtain the cross-platform installation package 102 from the distributor 104. The cross-platform installation package 102 can be distributed on physical media, such as Compact Discs (CDs), Digital Versatile Discs (DVDs), floppy disks, etc., via networks, such as Local Area Networks (LANs), the Internet, peer to peer links, wireless networks, etc., by being preinstalled on computer equipment, such as hard drives, flash drives, portable music players, etc., or any other technique that can be used to deliver digital content. In addition, the cross-platform installation package 102 can be included in a data file for the application. Thus, the data file for an application can include an installable copy of the application itself.

When such a data file is to be opened, the data file can first be handled by enabling software separate from the application, such as a virtual machine, transcoder, and/or runtime library. This enabling software can check whether the application has already been installed, and if not, install the application using the techniques described herein. In either event (installation or confirmation of previous install), the application is then provided with access to the original data/installation file for further processing in accordance with the functions provided by the application.

A native installation package 106 can be created from the cross-platform installation package 102. In some implementations, the user can create the native installation package by double clicking on an icon representing the cross-platform installation package 102 to open it for transcoding. As used herein, the term "transcoding" refers to a process of converting a cross-platform installation package into a native installation package. This transcoding process can involve extracting an appropriate native digital signature from the cross-platform installation package and adding this native digital signature into the native installation package. A transcoding program can run on the user's computer and use the included source materials 126, 128, 130, and an appropriate one of the native digital signatures 156, 160, 162, 164 (if needed), to generate the native installation package 106 specific to the platform of the target computer 108. In some cases, a native installation package 110 can be generated for a different target computer 116 with a platform different than the platform of the generating computer 108. In such cases, the transcoder can be designed to generate native installation packages for multiple platforms. In some implementations, several, different transcoders can be used, where each transcoder generates a native installation package for a given platform. In some implementations, a transcoder can be run on multiple platforms by being written in a cross-platform language such as Java or SWF.

The user can install the application using the native installation package 106 generated from the cross-platform installation package 102. The native installation package 106 can use the native operating system installer to install the application; this enables use of the installation procedures that are native to the platform, including native digital signature checking. Maintenance performed on the target computer, e.g. setup, reinstallation, removal, etc., can be done using the utilities native to the OS. In some implementations, execution of the native installation package can be initiated automatically after generation of the native installation package. In other words, the same action that initiates creation of the native installation package, such as a double click on an icon, can also initiate the execution of the native installation package when generation is complete. Alternatively, initiating installation using the native installation package can be dependent on additional input.

Users can create native installation packages for other computers. Native installation packages can be generated for computer platforms that are different than the platform used to create the native installation package. For example, a computer running a Windows® operating system (available from Microsoft Corporation) could generate a native installation package for a Mac OS® operating system (available from Apple Computer Inc.), or vice versa. The same cross-platform installation package can be used to create native installation packages for multiple, different computers. For example, an administrator can create native installation packages on a single computer running a Windows® operating system to install an application on a laptop running a Mac OS® operating system, multiple desktop PCs running a Windows® operating system, and a cluster of servers running a Linux® operating system (an open source operating system developed by Linus Torvalds et. al.). In some instances, a user can create multiple, different native installation packages to install an application on a single computer that is capable of running multiple operating systems, such as a Windows® operating system or Linux® operating system, by booting off different disk partitions or running virtualization software.

As an example, an administrator who uses a computer running a Windows® operating system can obtain from a software distributor a CD-ROM, which includes a cross-platform installation package for an image editing tool. If not already present, the administrator can install an appropriate transcoder from the CD-ROM to generate a native installation package corresponding to his or her computer. The administrator can choose to have the transcoder initiate installation using the native installation package once this package is finished generating, causing the image editing tool to be installed on the computer using the installer native to the Window® OS. As an alternative, the administrator can choose to have the transcoder only generate the native installation package, which can then be processed by the native installer at a later time, such as when a user clicks on a single icon representing the generated native installation package (i.e., the install file generated by the transcoder).

Figure 2:
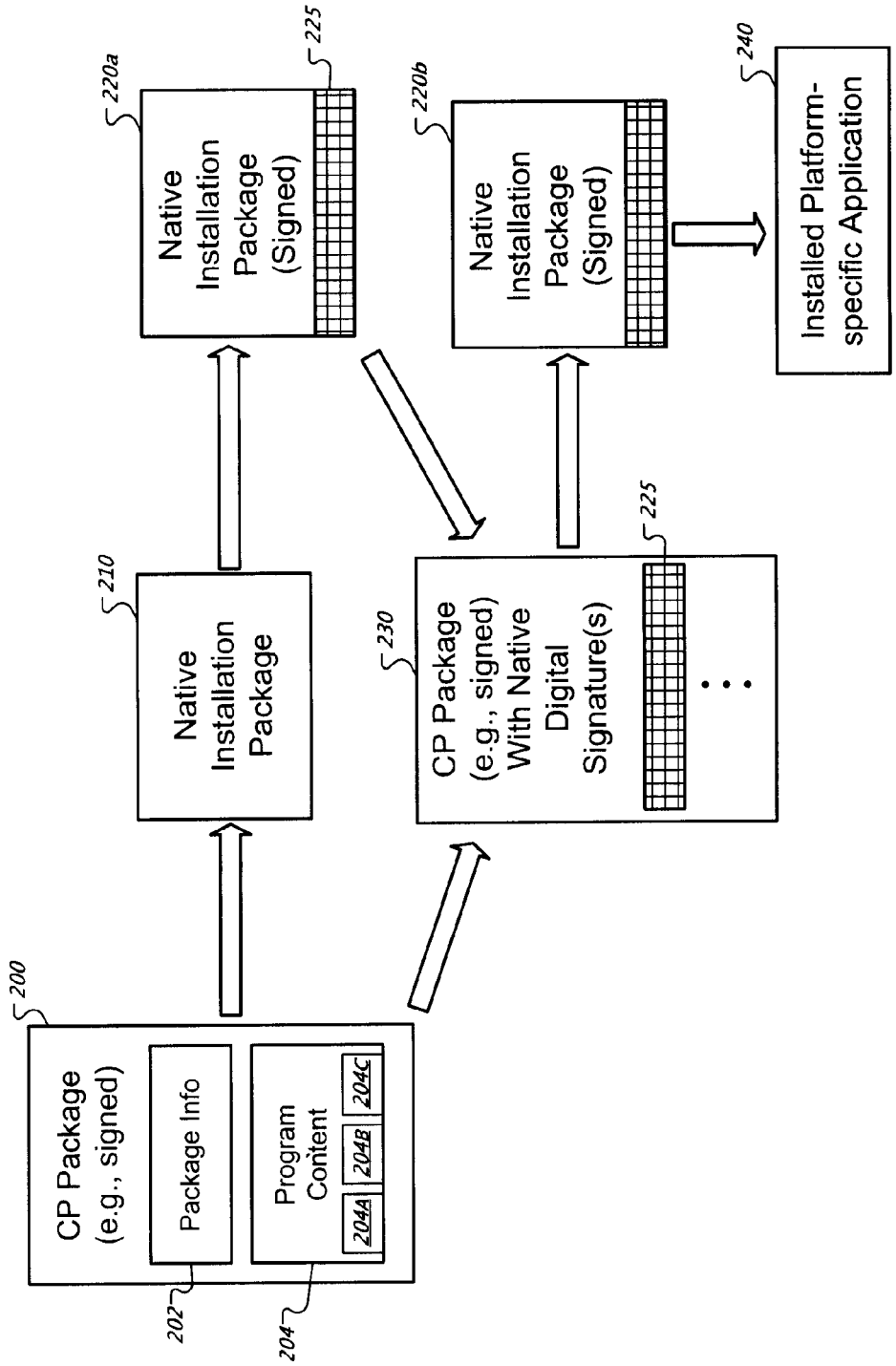
FIG. 2 is a block diagram showing an example of a process that creates a cross-platform installation package with a native digital signature.

FIG. 2 is a block diagram showing an example of a process that creates a cross-platform installation package with a native digital signature. This process can be performed by one or more transcoders, which can be included in a packaging tool (e.g., part of a software development kit for application developers), which can take a set of application files and combine them to form a single cross-platform installation package for distribution. The one or more transcoders can also be included in an installation tool located on a target computer. For example, the transcoder(s) can be included with a virtual machine or runtime environment that provides software services for processes or programs while a computer is running, and this virtual machine or runtime environment can be included in a packaging tool used by developers and can include an installation tool used by software users to install applications that run in the virtual machine or runtime environment.

In any case, a cross-platform (CP) package 200 can be created and can be converted into a native installation package 210. The cross-platform package 200 includes package information 202 and program content 204. The package information 202 describes the content of the cross-platform package 200. The cross-platform package can include instructions related to generating native operating system installers. The package information 202 can include information useable in an installation sequence, which can be stored in eXtensible Markup Language (XML) or other platform independent format. For example, the cross-platform installation package 200 can be stored as a compressed and/or encrypted file (e.g., a Zip file), and the package information 202 can be stored in an XML file included within the compressed and encrypted file. This XML file can contain information used by the transcoder(s), such as the application name, the application version, publisher name, an icon for the application (e.g., in .png format), a default installation directory, file extensions registered by the application, and Multipurpose Internet Mail Extensions (MIME) content types registered by the application. Moreover, this XML file can contain one or more references to the information used by the transcoder 210, rather than the actual data itself, in which case these reference(s) also constitute information useable in an installation sequence. In general, the package information 202 can include a description of all the items an installation sequence uses, but abstracted away from platform-specific notions.

The program content 204 in the cross-platform package 200 can include source code, object code, configuration files, icons, libraries, documentation, etc. In some implementations, some source material for creating the native installation package 210 can be pulled from a remote source over a network connection. In some implementations, some source material for creating the native installation package 210 can already be present on the target computer or in the transcoder. In some implementations, the cross-platform package 200 can include transcoders for multiple, different platforms so that the user can find all the required elements to begin installation already present, regardless of which type of platform is used for a target.

In general, the program content 204 can include first, second and third sets 204A, 204B, 204C of information. The first set 204A includes the information that is copied by the transcoder directly from the cross-platform package 200 to the native package 210 without any modifications. For example, this program content can be interpreted code that relies on a runtime library to operate, such as SWF. The second set 204B includes the information that is modified by the transcoder 210 during conversion from the cross-platform package 200 to the native package 210. For example, this program content can include an application icon stored in Portable Network Graphics (PNG) format, which can be translated into the Windows® Icon format (ICO) for a Windows® platform. The third set 204C includes any information that is specific to a first platform and thus need not be added to the native package 210 when generated for a second, different platform (although such information may be included in the package 210, and just not used on the second platform).

The cross-platform package 200 can itself be digitally signed. In such implementations, a check can be made for a valid digital signature on the cross-platform package 200 before it is converted. This digital signature check can be entirely platform independent (e.g., a digital signature scheme specific to the runtime environment that supports cross-platform installation packages as described). But regardless of whether or not the cross-platform package 200 is digitally signed, once the native installation package 210 is created, it is digitally signed using a digital signature scheme native to a platform type targeted for final installation. This can be done using a service provided by an operating system of the target type, or using a service provided over a network (e.g., a signing service such as that provided over the Internet by the VERISIGN® system). Moreover, this can be done using the same software that created the native installation package 210.

In any case, the result of this digital signing is a signed native installation package 220a (e.g., a single install file that can be run on a computer of the target platform type), which a native OS installer can use to install the application on a target computer, including checking that digital signature information 225 is correct. The digital signature information 225 can then be extracted from the signed native installation package 220a and combined with the cross-platform package 200 to create a new cross-platform installation package 230, which includes the digital signature information 225 for a particular target platform.

The cross-platform installation package 230 can then be distributed and installed on various computers, including one that requires the digital signature information 225. In this case, the cross-platform installation package 230 is converted into a signed native installation package 220b by first converting the package itself in the same manner as before, and then adding a copy of the digital signature information 225 to the installation package 220b in appropriate location(s). The resulting signed native installation package 220b can then be used to create an installed platform-specific application 240, such as by performing installation of the signed native installation package 220b using a native OS installer on the target computer. Moreover, before the cross-platform installation package 230 is complete and ready for distribution, the process of creating and incorporating the digital signature information 225 can be repeated for multiple, different target platforms. Thus, the final cross-platform installation package 230 can be ready for installation on different types of computer systems that require different native digital signature checks.

Figure 3:
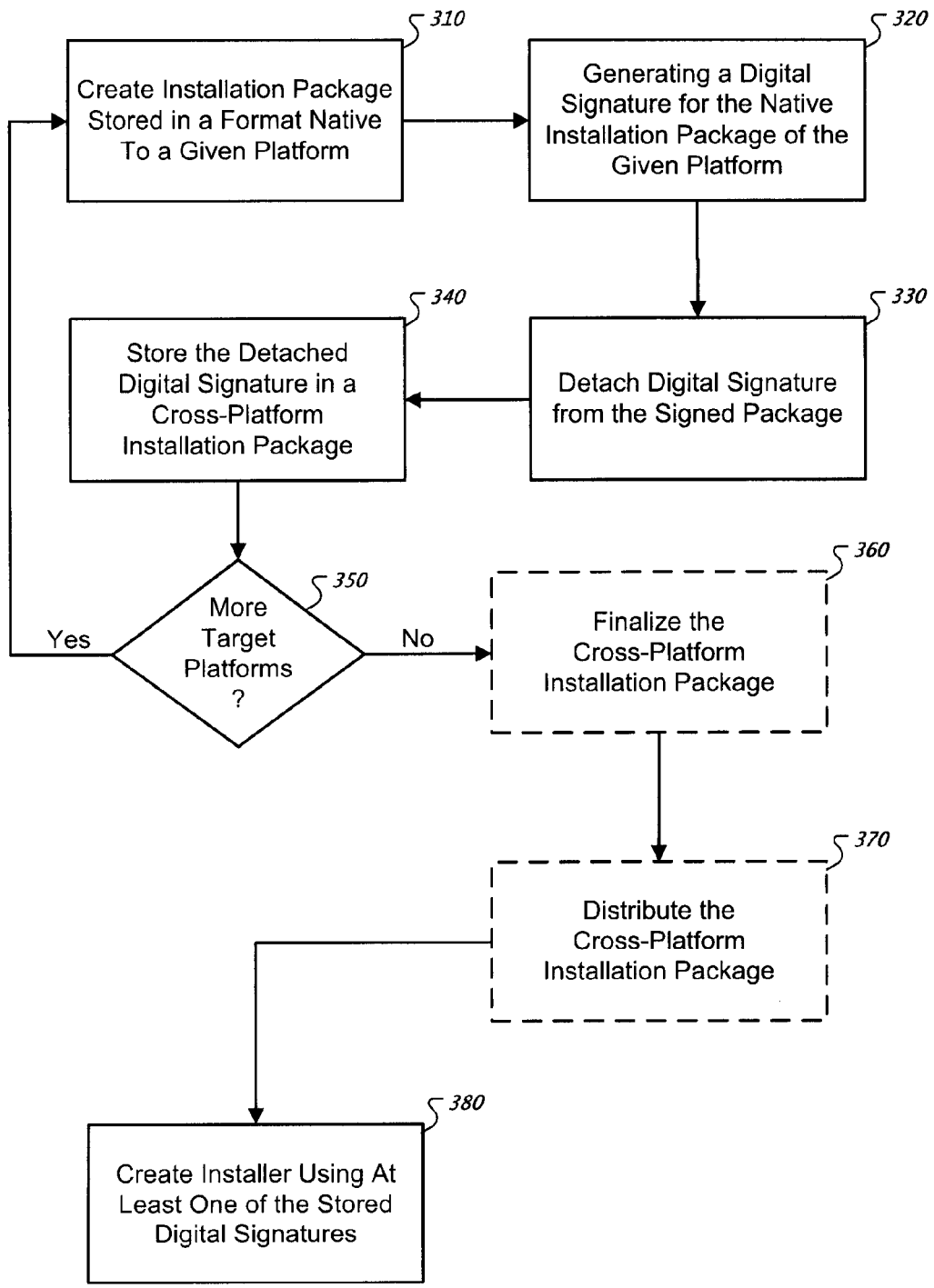
FIG. 3 is a flowchart showing an example of a process that creates a cross-platform installation package with a native digital signature.

FIG. 3 is a flowchart showing an example of a process that creates a cross-platform installation package with a native digital signature. An installation package stored in a format native to a given platform is created 310. For example, when the given platform is a computer running a Windows® operating system, a Windows® system installer file (e.g., a .msi file or a .cab file) can be created that can then be used on a computer of the given type to install application software. This native installation package can be created directly from multiple source input files, or this native installation package can be created from a cross-platform installation package that is readily convertible to formats native to multiple different target platforms. For example, the native installation package can be created from a .air file of the ADOBE® AIR™ software, available from Adobe Systems Incorporated of San Jose, Calif. Moreover, when creating the native installation package, the software (e.g., a packaging tool of a software development kit) can use a document native to the target platform, such as one or more template executables and template installation packages, to form the native installation package.

In any case, the file set used as input to the native installation package creation process should be the same across all native packages for target platforms and also the same as that used in a final cross-platform installation package. This can ensure the accuracy and reproducibility of the digital signatures generated. A software development kit can be provided with a command line tool that allows creation of the respective native installation packages. Moreover, when the output is to be a digitally signed cross-platform installation package, the input to the native installation package creation process can be a digitally signed cross-platform installation package (e.g., a signed .air file) or a file set and a certificate from which a signed cross-platform installation package can be created.

A digital signature is generated 320 for the native installation package of the given platform. This can include signing executables or libraries as well as signing the native installation package itself. This native signing of the installation package can be done by the conversion software itself (e.g., code in the packaging tool), using standard platform tools and processes provided by the target platform, or both. The native signing 320 can be done by a software developer, a software publisher, or by a third party. For example, if the developer has access to the native signing certificate, an installer creation tool can be extended to accept this certificate, perform the native signing, and proceed with subsequent operations in a single invocation.

In another example, the native installation package can be sent to a third party (e.g., transmitted to VERISIGN over the INTERNET) for digital signing. The third party can sign and return the native installation package. An installer creation tool can receive as input this signed, native installation package, along with the source file set, to create a cross-platform installation package. For example, in the mobile device space (e.g., second generation mobile phones) it is common to require that applications be signed by third party certificate authorities. The present systems and techniques are readily applicable to such work flows.

The digital signature can be detached 330 from the signed, native installation package. Although native packages will vary, they can be modeled as having the following basic form: (1) signed data than needs to be reproduced exactly, (2) signature data, (3) items 1 and 2 repeated zero or more times. Each native installation package can be traversed to strip out the signature data. Each piece of signature data can be stored, bit-for-bit, in a separate file. These files can be put into the final cross-platform installation package as metadata for later use (e.g., in a META-INF/AIR directory for a .air file). For example, for an MSI file, there might be the following two pieces of signature data: (1) META-INF/AIR/signatures/msi/MyApp.exe.signature, and (2) META-INF/AIR/signatures/msi/PackageSignature.

Consistency checks can also be performed at this stage. Each incoming native package can be required to contain exactly the same version of the same application. Otherwise, the correct version at install time may be indeterminable. Other consistency checks can also be applied, such as checks specific to a native signing mechanism. For example, some signing mechanisms divide the executable into chunks, sort the chunks by name and then sign them in the sorted order. The transcoding process can be re-run on the cross-platform package to make sure it generates the same native package, minus the signatures. Moreover, the version of the transcoding process implementation can be recorded in the resulting cross-platform package, as described further below. Regardless, the detached digital signature can be stored 340 in a cross-platform installation package for the given platform and for each target platform thereafter.

Moreover, more than one digital signature can be generated 320 for the native installation package for a given target platform. For example, in some implementations in the mobile device space, the native installation package can be signed differently depending on the carrier the package is being deployed on. Thus, for a particular OS, an application installation package can be signed with different algorithms to create different signatures for different mobile networks in a given market (e.g., NTT Docomo, Inc. network versus KDDI Corporation network versus Softbank Mobile Corp. network in Japan). In such implementations, the detaching 330 and storing 340 are repeated for each respective digital signature for a given platform. Alternatively, the mobile carrier can be considered part of the platform definition, and a different digital signature can be generated 320 for each mobile-device/OS/carrier combination in this manner as well.

A check is made 350 as to whether more target platforms remain. If so, native package creation, signing and signature extraction continues until a digital signature has been acquired for each of multiple target platforms. After this, the cross-platform installation package can be finalized 360. This can involve adding any remaining information, changing appropriate formatting, etc. in the cross-platform installation package. For example, version information for the packaging tool (e.g., a version number for an underling runtime) can be added to the cross-platform installation package (e.g., stored in another file, such as META-INF/AIR/signatures/msi/versionInfo). Alternatively, such information can be added earlier in the process, and the cross-platform installation package can be in its final form after the last digital signature is added. Moreover, even after finalization, additional digital signatures can be added later; in fact, additional platforms can be added either at the same time, or at a later time.

The cross-platform installation package can be distributed 370 for remote installation. As addressed above in connection with FIG. 1, the cross-platform installation package can be converted into a native installation package at many different times and locations. In any case, at some point and at some location, an installer can be created 380 using at least one of the stored digital signatures. The native installation package can be created from the cross-platform package for the given target computer, and the appropriate digital signature can be selected from the cross-platform package and added to the native package. Thus, the single cross-platform installation package can be installed on multiple, different computer platforms while fully supporting software validation through each native digital signature mechanism. This can be accomplished without adding significantly to the size of the cross-platform installation package since only the native digital signatures themselves need be added to the cross-platform package. Each piece of signature data can be on the order of a few kilobytes (uncompressed), so given six target platforms and several signatures each, the detached signatures can add on the order of a hundred kilobytes to the size of the installation file.

Figure 4:
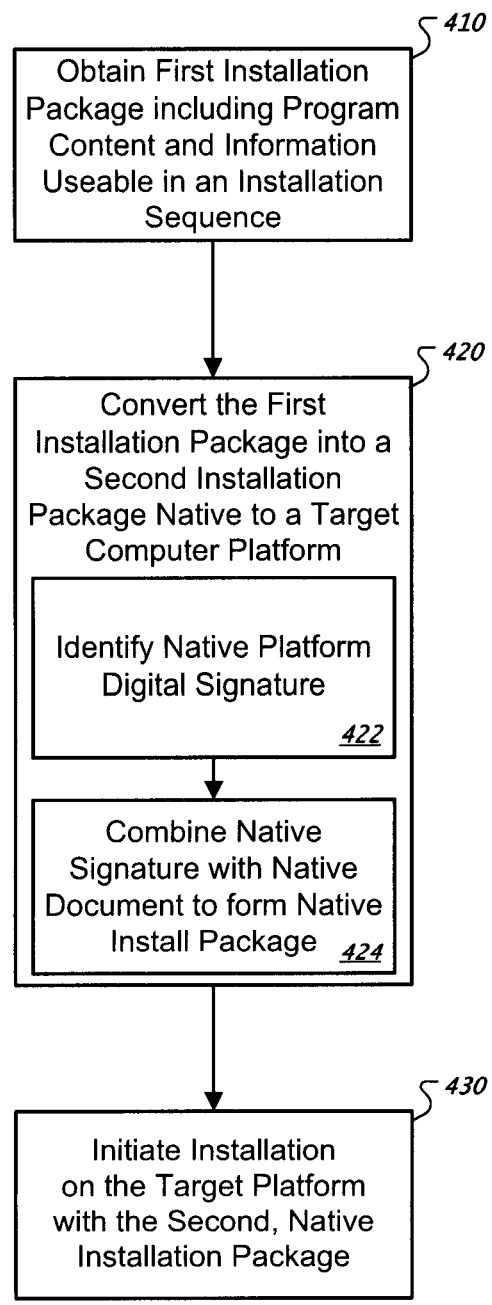
FIG. 4 is a flowchart showing an example of a process that creates a native installation package from a cross-platform installation package.

FIG. 4 is a flowchart showing an example of a process that creates a native installation package from a cross-platform installation package. A first installation package is obtained 410, where the package includes program content, plus package information stored in a platform independent format and useable in an installation sequence. The first installation package can be a cross-platform installation package as described above, which is simply received, or it can be created as described above. Regardless of how it is obtained, the first installation package is then converted 420 into a second installation package stored in a format native to a target platform. The second, native installation package includes at least a portion of the program content and the information useable in the installation sequence, and the native installation package includes signature data in accordance with a digital signature scheme of the target platform.

The converting 420 includes identifying 422 a digital signature native to the target platform, and combining 424 the digital signature native to the target platform with a document native to the target platform. The native document includes at least a portion of the program content. The native document can be a template document in a format native to the target platform, to which some program content is added from the first installation package (e.g., a template executable to which application code is added), or the native document can be a document in a format native to the target platform, which is stored in the first installation package. Thus, the second installation package is created from the first installation package, where the second installation package is in a format native to the target platform and also includes a digital signature (e.g., one or more pieces of digital signature data at one or more locations in an installation file), even though the second package is not actually digitally signed using a private key at the time of its creation.

Installation can then be initiated 430 on the target platform with the second, native installation package. This, can involve beginning the install on the local computer. Alternatively, this can involve sending the second package to one or more other computers for installation at those location(s) or beyond.

Figure 5:
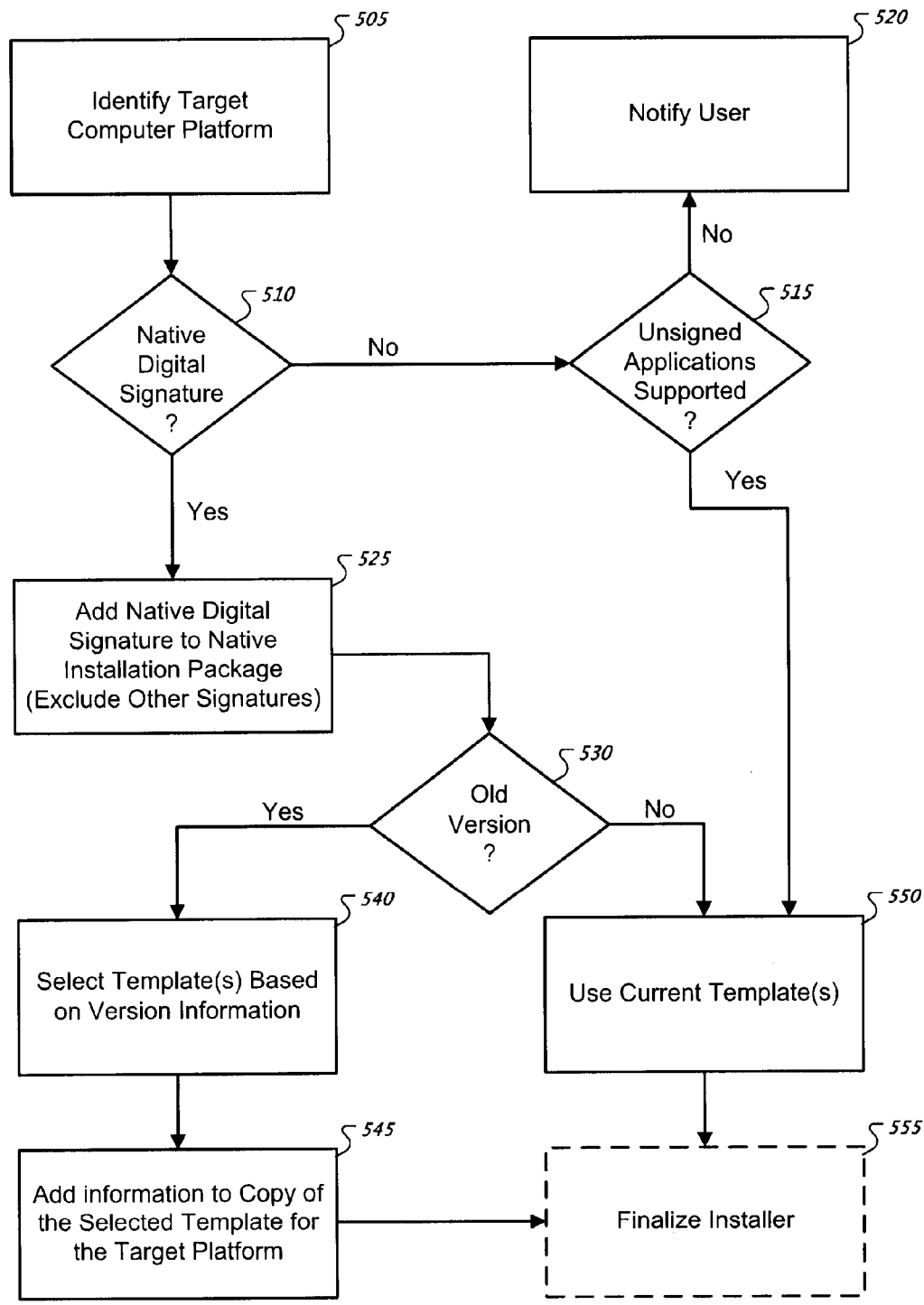
FIG. 5 is a flowchart showing an example of a process that converts a cross-platform installation package into a native installation package.

FIG. 5 is a flowchart showing an example of a process that converts a cross-platform installation package into a native installation package. The target computer platform is identified 505. This can involve receiving input from a user or the local computer. For example, the user can specify the target platform for the output package to be created, or the installation tool can identify the type of platform of the current computer (e.g., WINDOWS® OS, MAC® OS, SYMBIAN OS®, or LINUX® OS based computer).

A check is made 510 to determine if a native digital signature is available for the target computer platform. If not, installation can still proceed. A check can be made 515 to see if unsigned applications are supported (note that this determination may be impacted by the target platform at hand). If so, the process can proceed. All the stored native digital signatures (e.g., the contents of META-INF/AIR/signature directory) can be discarded at this point since they are no longer needed. If natively unsigned applications are not supported, a user can be notified 520 that a native digital signature is not available for the target platform, for which this digital signature is required.

In addition, note that the cross-platform package can still be digitally signed, and this signature can be verified by the installation tool using a digital signature scheme that is not specific to a particular target platform. Such a cross-platform level digital signature can be designed to not use any of the stored native digital signatures as input, since in some implementations, the native digital signatures can be stored in the cross-platform package after it has already been digitally signed to create a cross-platform level digital signature.

Thus, the validation process for the cross-platform package can ignore the stored native digital signatures entirely. Alternatively, the validation process can check the stored native digital signatures, such as to confirm the names and locations of the unneeded digital signatures, before discarding them, and validate the cross-platform digital signature using other portions of the cross-platform package.

When an appropriate native digital signature is found, it can be added 525 to the native installation package being created. This can occur at different points in the conversion process. For example, the native installation package can be fully created first, and then the native digital signature can be inserted where appropriate. Alternatively, the native digital signature can be added during an intermediate stage of the process to generate the native installation package. Moreover, one or more additional digital signatures that are not native to the target platform can be excluded from the second installation package.

A check can be made 530 to see if the first installation package was created using an older version of the conversion software (e.g., an older version of the packaging tool corresponding to a runtime environment). If not, one or more current templates can be used 550 in creating the second, native installation package. This can involve using the most up-to-date template executable(s), template installation package(s), etc. that are available.

If the first installation package was created using an older version of the conversion software, the version information can be identified, and one or more templates can be selected 540 based on the version information. This check 530 and selection 540 can occur at different points in the conversion process. For example, these operations can be performed later in the processing, as shown. Alternatively, these operations can be performed up front. In any case, any information copied from the conversion software itself (e.g., from the runtime) should correspond to that found in the same version of the conversion software used to create the first installation package. Future software releases can contain these documents for multiple versions. For example, software version 1.5.2 can contain template executables for past versions 1.0, 1.0.1, 1.1, 1.5, 1.5.1, and 1.5.2.

Including such template documents can increase the size of the software program on the order of one hundred Kilobytes (uncompressed) per release. Note that at some point, older versions of the template documents can be discarded as being too old. In such cases, the native installation package can be created without the native digital signature, the user can be notified of the version incompatibility, or both. In addition, in such implementations, appropriate notices can be provided to help prevent a user from uninstalling and then reinstalling an old application for which the templates are no longer being maintained.

Information is added 545 to a copy of the selected template document for the target platform. This is part of the process of creating the second, native installation package, and is thus done in similar fashion as described above. In addition, it should be noted that the installer creation code can also be versioned such that the program behavior of older versions is also available. The package creation code for the identified version inserts the piece(s) of signature data in the correct location(s). Once any finalization 555 of the native installation package is completed, the generated native installer matches that which was created and discarded in the course of creating the first installation package initially. Thus, it can now be used to initiate installation on a target computer of the identified target platform type.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining, by a computer, a first installation package comprising program content and package information stored in a platform independent format and useable in an installation sequence;
converting, by the computer, the first installation package into a second, native installation package stored in a format native to a target platform, the second, native installation package including at least a portion of the program content and the package information useable in the installation sequence, and the converting includes:
identifying, in the first installation package, a digital signature native to the target platform;
excluding one or more additional digital signatures that are not native to the target platform from inclusion in the second, native installation package;
combining the digital signature native to the target platform with a document that includes at least a portion of the program content and is native to the target platform; and
initiating, by the computer, installation on the target platform with the second, native installation package.

2. The method of claim 1, wherein the converting comprises employing disparate conversion processes based on version information for the first installation package.

3. The method of claim 2, wherein employing the disparate conversion processes comprises:
selecting a template document from multiple different versions based on the version information for the first installation package; and
adding information to a copy of the selected template document for the target platform.

4. The method of claim 1, wherein the obtaining comprises, for each of multiple given platforms:
creating an installation package stored in a format native to the given platform;
generating a digital signature using the installation package stored in the format native to the given platform; and
adding the digital signature to information of a cross-platform installation package to form the first installation package.

5. The method of claim 4, wherein the creating comprises converting, at a first computer controlled by a first party, the cross-platform installation package into the installation package stored in the format native to the given platform, and the generating comprises generating, at a second, different computer, controlled by a second, different party, the digital signature using the installation package stored in the format native to the given platform.

6. A non-transitory computer storage medium encoded with a computer program, the computer program comprising instructions that when executed by a data processing apparatus cause the data processing apparatus to perform operations comprising:
obtaining a first installation package comprising program content and package information stored in a platform independent format and useable in an installation sequence;
converting the first installation package into a second, native installation package stored in a format native to a target platform, the second, native installation package including at least a portion of the program content and the package information useable in the installation sequence, and the converting includes:
identifying, in the first installation package, a digital signature native to the target platform;
excluding one or more additional digital signatures that are not native to the target platform from inclusion in the second, native installation package;
combining the digital signature native to the target platform with a document that includes at least a portion of the program content and is native to the target platform; and
initiating installation on the target platform with the second, native installation package.

7. The non-transitory computer storage medium of claim 6, wherein the converting comprises employing disparate conversion processes based on version information for the first installation package.

8. The non-transitory computer storage medium of claim 7, wherein employing the disparate conversion processes comprises:
selecting a template document from multiple different versions based on the version information for the first installation package; and
adding information to a copy of the selected template document for the target platform.

9. The non-transitory computer storage medium of claim 6, wherein the obtaining comprises, for each of multiple given platforms:
creating an installation package stored in a format native to the given platform;
generating a digital signature using the installation package stored in the format native to the given platform; and
adding the digital signature to information of a cross-platform installation package to form the first installation package.

10. The non-transitory computer storage medium of claim 9, wherein the creating comprises converting, at a first computer controlled by a first party, the cross-platform installation package into the installation package stored in the format native to the given platform, and the generating comprises generating, at a second, different computer, controlled by a second, different party, the digital signature using the installation package stored in the format native to the given platform.

11. A system comprising:
one or more computers operable to interact with a device and perform operations of software package installation, the one or more computers configured to:
obtain a first installation package comprising program content and package information stored in a platform independent format and useable in an installation sequence;
convert the first installation package into a second, native installation package stored in a format native to a target platform, the second, native installation package c including at least a portion of the program content and the package information useable in the installation sequence, and to convert the first installation package, the one or more computers are further configured to:

identify, in the first installation package, a digital signature native to the target platform;

exclude one or more additional digital signatures that are not native to the target platform from inclusion in the second, native installation package;

combine the digital signature native to the target platform with a document that includes at least a portion of the program content and is native to the target platform; and initiate installation on the target platform with the second, native installation package.

12. The system of claim 11, wherein the one or more computers comprise a server operable to interact with the device through a data communication network, and the device is operable to interact with the server as a client.

13. The system of claim 11, wherein the one or more computers consist of one computer, the device is a user interface device, and the one computer comprises the user interface device.

14. The system of claim 11, wherein, to convert the first installation package, the one or more computers are further configured to utilize disparate conversion processes based on version information for the first installation package.

15. The system of claim 14, wherein, to utilize the disparate conversion processes, the one or more computers are further configured to:

select a template document from multiple different versions based on the version information for the first installation package; and add information to a copy of the selected template document for the target platform.

16. The system of claim 11, wherein, to obtain the first installation package, for each of multiple given platforms, the one or more computers are further configured to:

create an installation package stored in a format native to the given platform;

generate a digital signature using the installation package stored in the format native to the given platform; and add the digital signature to information of a cross-platform installation package to form the first installation package.

17. The system of claim 16, wherein, to create the installation package stored in the format native to the given platform, the one or more computers are further configured to convert, at a first computer controlled by a first party, the cross-platform installation package into the installation package stored in the format native to the given platform, and, to generate the digital signature, the one or more computers are further configured to generate, at a second, different computer, controlled by a second, different party, the digital signature using the installation package stored in the format native to the given platform.

* * * * *

UNITED STATES PATENT AND TRADEMARK OFFICE
CERTIFICATE OF CORRECTION

PATENT NO. : 8,464,249 B1
APPLICATION NO. : 12/562021
DATED : June 11, 2013
INVENTOR(S) : Oliver Goldman et al.

It is certified that error appears in the above-identified patent and that said Letters Patent is hereby corrected as shown below:

In the Claims

Column 16, Line 63, delete "c" after "…native installation package", therefor.

Signed and Sealed this
Fifth Day of November, 2013

Teresa Stanek Rea
*Deputy Director of the United States Patent and Trademark Office*